United States Patent

Nakamura et al.

Patent Number: 5,959,765
Date of Patent: Sep. 28, 1999

[54] OPTICAL WAVELENGTH CONVERSION ELEMENT AND METHOD OF MANUFACTURING THE SAME

[75] Inventors: Takashi Nakamura; Takashi Yamada, both of Kanagawa-ken, Japan

[73] Assignee: Fuji Photo Film Co., Ltd., Kanagawa-ken, Japan

[21] Appl. No.: 08/934,937

[22] Filed: Sep. 19, 1997

[30] Foreign Application Priority Data

Sep. 20, 1996 [JP] Japan ................................. 8-249976

[51] Int. Cl.⁶ .................................................... G02F 1/35
[52] U.S. Cl. .......................................... 359/326; 252/584
[58] Field of Search .................................. 359/326–332; 385/122; 372/21, 22; 252/582, 584

[56] References Cited

U.S. PATENT DOCUMENTS

| | | | |
|---|---|---|---|
| 5,274,727 | 12/1993 | Ito et al. | 385/122 |
| 5,614,129 | 3/1997 | Hofmeister et al. | 252/584 |
| 5,838,486 | 11/1998 | Sonoda et al. | 359/332 |

*Primary Examiner*—John D. Lee
*Attorney, Agent, or Firm*—Sughrue, Mion, Zinn, Macpeak & Seas, PLLC

[57] ABSTRACT

An optical wavelength conversion element is formed of a ferroelectric material which has a nonlinear optical effect, and is provided with periodic domain reversals arranged in one direction and converts the wavelength of a fundamental wave impinging thereupon in the direction in which the periodic domain reversals are arranged. The ferroelectric material is $LiNb_xTa_{1-x}O_3$ ($0 \leq x \leq 1$) doped with at least one of Zn, Sc and In.

2 Claims, 4 Drawing Sheets

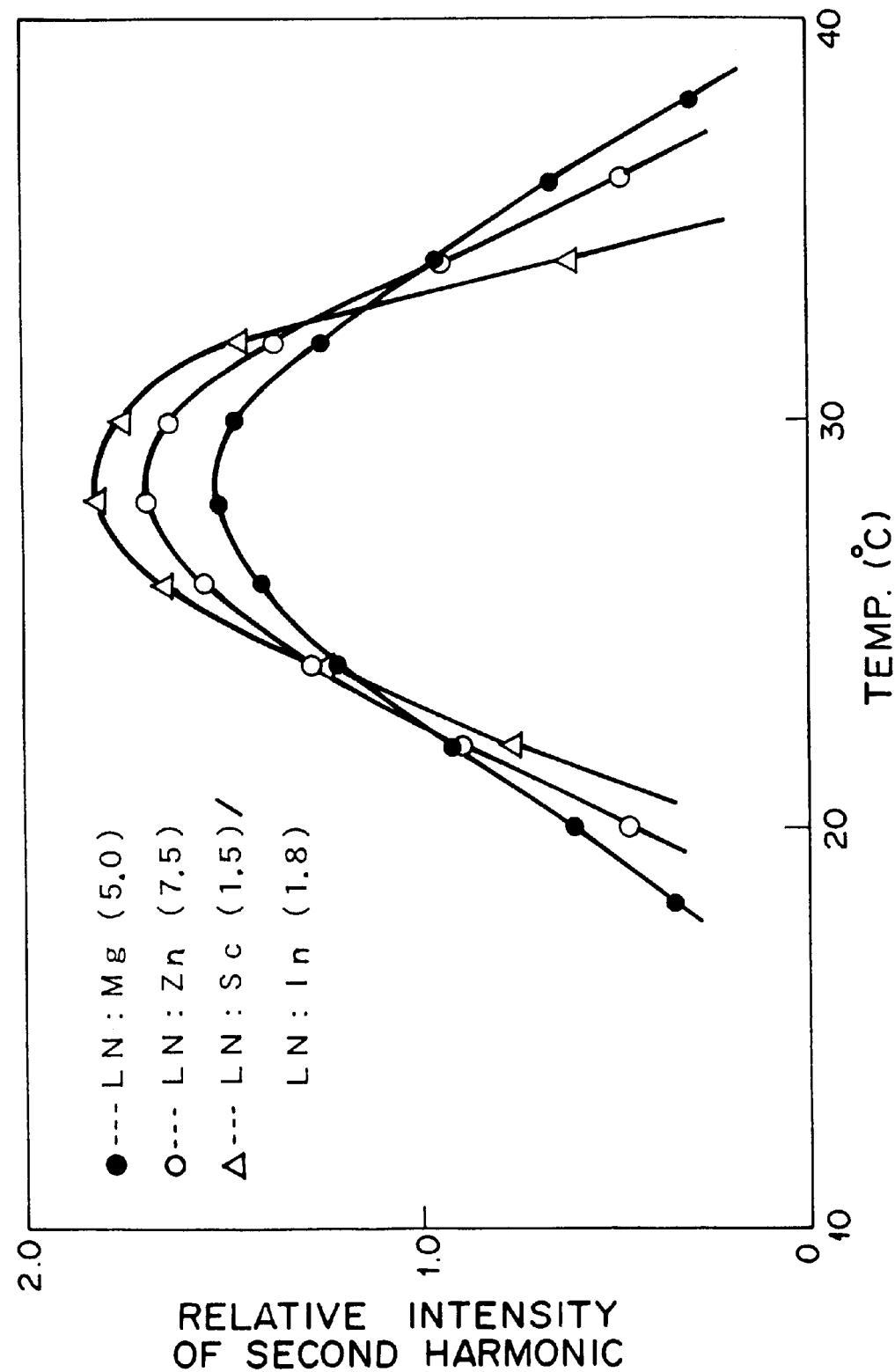

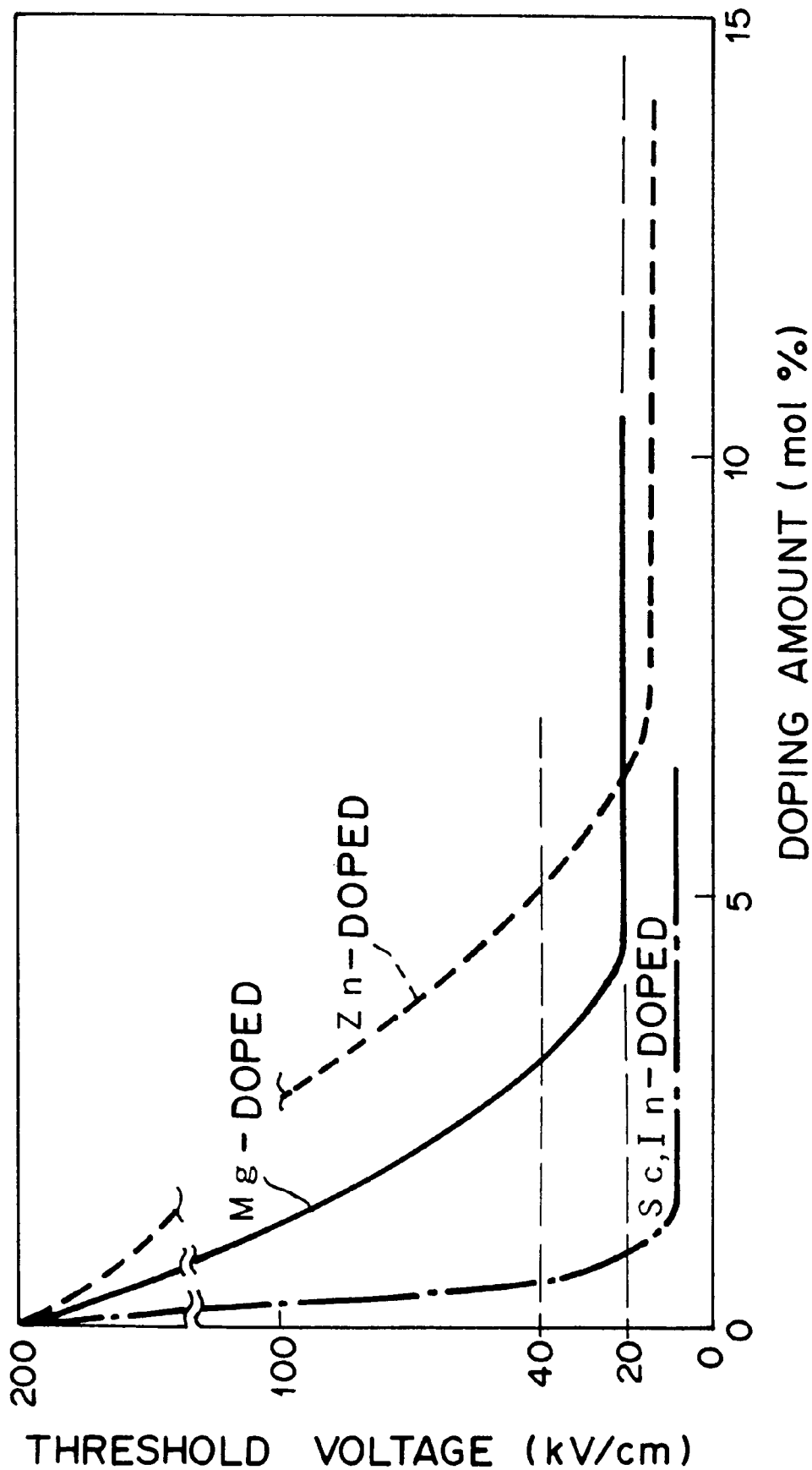

OPTICAL WAVELENGTH CONVERSION ELEMENT AND METHOD OF MANUFACTURING THE SAME

BACKGROUND OF THE INVENTION

1. Field of the Invention

This invention relates to an optical wavelength conversion element which converts a fundamental wave to a second harmonic, and more particularly to an optical wavelength conversion element in which periodic domain reversals are formed on a ferroelectric material having a nonlinear optical effect. This invention further relates to a method of manufacturing such an optical wavelength conversion element having domain reversals.

2. Description of the Related Art

There has been proposed by Bleombergen and et al. a method of converting a fundamental wave to a second harmonic by use of an optical wavelength conversion element formed with a region where the spontaneous polarization (domain) of a ferroelectric material having a nonlinear optical effect is periodically reversed. (See Phys. Rev., vol. 127, No. 6, 1918 (1962)) In this method, by setting pitches $\Lambda$ of the domain reversals to an integer multiple of the coherence length $\Lambda c$ given by formula $$\Lambda c = 2\pi / \{\beta(2\omega) - 2\beta(\omega)\} \quad (1)$$

wherein $\beta(2\omega)$ represents the propagation constant of the second harmonic and $\beta(\omega)$ represents the propagation constant of the fundamental wave, phase matching (artificial phase matching) between the fundamental wave and the second harmonic can be obtained. When the wavelength is converted by use a bulk crystal of a nonlinear optical material, phase matching can be achieved only at a particular wavelength inherent to the crystal. However in accordance with the method described above, phase matching can be efficiently achieved for any wavelength by selecting pitches $\Lambda$ of the domain reversals to satisfy the formula (1).

As a ferroelectric material suitable for forming such periodic domain reversals, there has been known $LiNbO_3$ doped with Mg as disclosed, for instance, in U.S. Pat. No. 5,568,308. Mg-doped $LiNbO_3$ is higher than non-doped $LiNbO_3$ by more than two digits in the optical damage threshold value. Accordingly when periodic domain reversals are formed on Mg-doped $LiNbO_3$, an optical wavelength conversion element which can generate a high power wavelength-converted wave with a high wavelength conversion efficiency can be obtained.

As another ferroelectric material suitable for forming periodic domain reversals, there has been known $LiTaO_3$ doped with Mg. There have been made various attempts making optical waveguide type or bulk crystal type optical wavelength conversion elements by use of such ferroelectric materials.

As a method of forming periodic domain reversals on a ferroelectric material, there has been known a method in which periodical electrodes each having a predetermined width are formed on a ferroelectric substrate at predetermined pitches and electric fields are imparted to the ferroelectric substrate through the periodical electrodes as disclosed in U.S. Pat. No. 5,568,308.

However the conventional optical wavelength conversion elements comprising a substrate of Mg-doped $LiNbO_3$ or Mg-doped $LiTaO_3$ formed with periodic domain reversals are disadvantageous in that the pitches of the periodic domain reversals are apt to fluctuate and it is difficult to achieve a high wavelength conversion efficiency.

Further in the conventional optical wavelength conversion elements, each of the periodic domain reversals is apt to be formed wider than the width of each electrode though it should be equal to the width of each electrode. Thus there has been a problem that it is difficult to form each of the periodic domain reversals precisely in a desired width.

SUMMARY OF THE INVENTION

In view of the foregoing observations and description, the primary object of the present invention is to provide an optical wavelength conversion element in which the pitches of the periodic domain reversals and the width of each periodic domain reversal are formed precisely in desired values, whereby a high wavelength conversion efficiency can be obtained.

Another object of the present invention is to provide a method of manufacturing such an optical wavelength conversion element.

In accordance with a first aspect of the present invention, there is provided an optical wavelength conversion element comprising a ferroelectric material which has a nonlinear optical effect, which is provided with periodic domain reversals arranged in one direction and which converts the wavelength of a fundamental wave impinging thereupon in the direction in which the periodic domain reversals are arranged, wherein the improvement comprises that said ferroelectric material is $LiNb_xTa_{1-x}O_3$ ($0 \leq x \leq 1$) doped with at least one of Zn, Sc and In.

In accordance with a second aspect of the present invention, there is provided a method of manufacturing the optical wavelength conversion element comprising the step of applying electric fields to a single domain ferroelectric material of $LiNb_xTa_{1-x}O_3$ ($0 \leq x \leq 1$) doped with at least one of Zn, Sc and In through periodic electrodes formed in a predetermined pattern, thereby forming periodic domain reversals on the ferroelectric material.

When $LiNb_xTa_{1-x}O_3$ ($0 \leq x \leq 1$) doped with at least one of Zn, Sc and In is used as the ferroelectric material, the pitches of the periodic domain reversals and the width of each periodic domain reversal can be controlled more precisely to desired values as compared with the case where $LiNb_xTa_{1-x}O_3$ doped with Mg is used as the ferroelectric material, whereby a higher wavelength conversion efficiency can be obtained.

BRIEF DESCRIPTION OF THE DRAWINGS

FIG. 4 is a graph showing the intensity of wavelength-converted wave generated by the optical wavelength conversion element of the present invention in comparison with that generated by the conventional optical wavelength conversion element, FIG. 5 is a graph showing the domain reversal threshold voltages for different doping materials.

DESCRIPTION OF THE PREFERRED EMBODIMENTS

Figure 1:
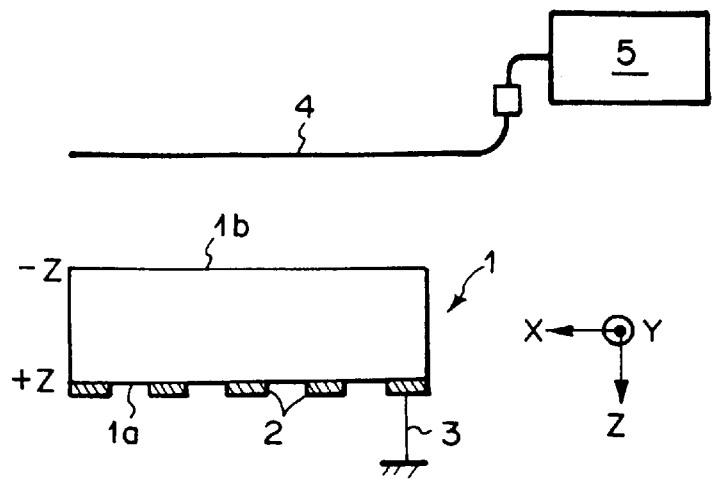
FIG. 1 is a schematic view for illustrating the manner of forming an optical wavelength conversion element in accordance with a first embodiment of the present invention.

An optical wavelength conversion element in accordance with a first embodiment of the present invention was formed. In FIG. 1, reference numeral 1 denotes a substrate of LiNbO$_3$ doped with 7.5 mol % Zn, which is a ferroelectric material having a nonlinear optical effect. This ferroelectric material will be referred to as "LN:Zn", hereinbelow. The LN:Zn substrate 1 was made to have a single domain and was cut into 0.5 mm in thickness. Further the LN:Zn substrate 1 was polished in a Z-face so that a nonlinear optical constant d$_{33}$, which is the largest, can be efficiently used.

Figure 2:
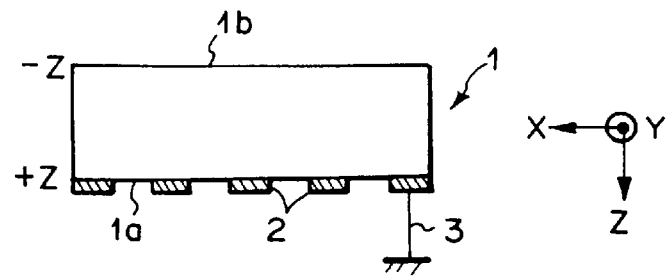
FIG. 2 is a schematic perspective view showing the domain reversals formed in the optical wavelength conversion element shown in FIG. 1.

Ta film was formed on +Z-face 1a (FIG. 2) of the Ln:Zn substrate 1 by sputtering of metal Ta and periodic electrodes 2 of Ta were formed by photolithography at pitches Λ as shown in FIG. 1. Each of the periodic electrodes 2 was 4 μm in width and the pitches Λ of the electrodes 2 was set to 12.9 μm taking into account the wavelength-dependent dispersion of the refractive index of LN:Zn so that the pitches become linear along x-direction of the substrate near 1313 nm.

Then while maintaining the substrate 1 at 90° C. and evacuating the space which +Z-face 1a faced to 10$^{-4}$ Ps, an electric field was applied to the substrate 1 by corona charging through a corona wire 4 disposed on the side of Z-face −Z-face 1b of the substrate 1 with the periodic electrodes 2 grounded by a ground wires. In this embodiment, a voltage of −20 kV/cm was applied for 4.5 seconds by a high voltage source 5 through the corona wire 4.

Then the periodic electrodes 2 were removed and the substrate 2 thus formed with periodic domain reversals 9 was cut along a Y-face. The cut surface (Y-face) was polished and was subjected to selective etching by use of etching liquid of a 1:2 mixture of HF and HNO$_3$. When the cut surface (Y-face) was visually inspected, it was found that the domain was periodically reversed through the substrate 1 from the −Z-face 1b to the +Z-face 1a at portions opposed to the periodic electrodes 2 as denoted by reference numeral 9 in FIG. 2. Arrows 10 in FIG. 2 indicate the directions of the domains.

Figure 3:
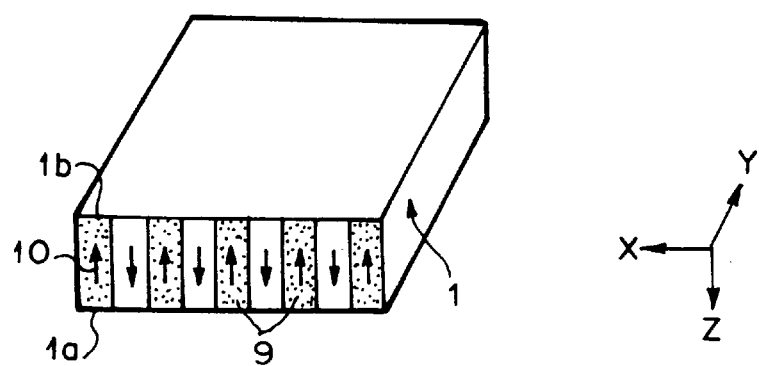
FIG. 3 is a schematic side view showing an example of application of the optical wavelength conversion element shown in FIG. 1.
Figure 6A:
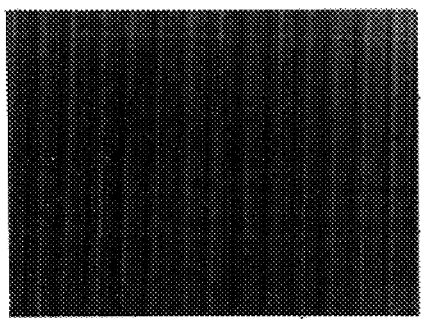
FIG. 6A is a microphotograph showing the periodic domain reversals formed in a conventional optical wavelength conversion element.
Figure 6C:
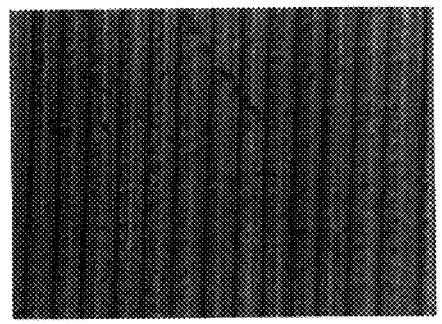
FIGS. 6B to 6D are microphotographs respectively showing the periodic domain reversals formed in the optical wavelength conversion elements in accordance with the first to third embodiments of the present invention.
Figure 6B:
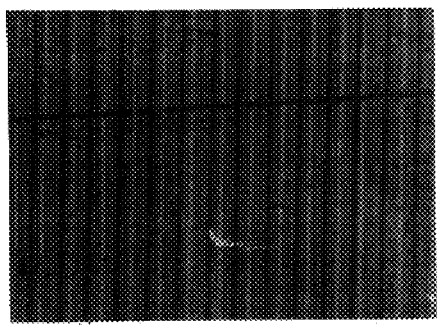
Figure 6D:
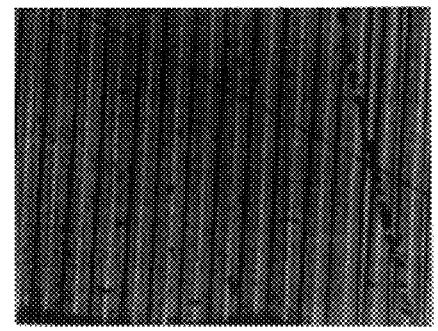

Thereafter the −X face and the +X face of the LN:Zn substrate 1 were subjected to optical polishing to make the faces light transmission faces 20a and 20b, whereby a bulk crystal type optical wavelength conversion element 20 shown in FIG. 3 was obtained. Then the optical wavelength conversion element 20 was disposed in a resonator of a laser diode-pumped YLF laser as shown in FIG. 3 and second harmonic was generated.

The laser diode-pumped YLF laser comprised a laser diode 22 which emitted a pumping laser beam 21 of a wavelength of 795 nm, a condenser lens 23 which converged the diverging laser beam 21, a YLF crystal 24 which was a laser medium doped with Nd and on which the laser beam 21 was converged, and a resonator mirror 25 disposed forward (rightward in FIG. 3) of the YLF crystal 24. The optical wavelength conversion element 20 was disposed between the YLF crystal 24 and the resonator mirror 25.

Pumped with the laser beam 21 of 795 nm, the YLF crystal 24 emits light of 1313 nm. The light resonates between an end face 24a of the YLF crystal 24 provided with a predetermined coating and the mirror surface 25a of the resonator mirror 25, whereby a solid laser beam 26 is generated. The solid laser beam 26 enters the optical wavelength conversion element 20 and is converted to a second harmonic 27 whose wavelength is 657 nm, one half of that of the laser beam 26. Substantially only the second harmonic 27 emanates from the resonator mirror 25. Phase matching (so-called artificial phase matching) is achieved in the reversed domain regions of the optical wavelength conversion element 20. The intensity of the second harmonic 27 and the like will be described later with reference to FIG. 4.

Optical wavelength conversion elements in accordance with second and third embodiment of the present invention and a control optical wavelength conversion element will be described, hereinbelow. These optical wavelength conversion elements differ from the optical wavelength conversion element of the first embodiment in the doping material, the amount of the doping material and the time for which the electric voltage is applied by corona charging as follows.

[1st embodiment] LN:Zn (7.5 mol %), −20 kV/cm×4.5 sec.

[2nd embodiment] LN:Sc (1.5 mol %), −20 kV/cm×3.5 sec.

[3rd embodiment] LN:In (1.8 mol %), −20 kV/cm×3.0 sec.

[control] LN:Mg (5.0 mol %), −20 kV/cm×9.0 sec.

The optical wavelength conversion elements of the second and third embodiments and the control were disposed in the laser diode-pumped YLF laser shown in FIG. 3 in place of the optical wavelength conversion element of the first embodiment and the laser was operated to generate a second harmonic. The intensities of the second harmonics for the respective cases are shown in FIG. 4 in relative values together with that for the case where the optical wavelength conversion element of the first embodiment was employed. The results of the cases where the optical wavelength conversion elements of the second and third embodiments were employed were the substantially the same.

As can be understood from FIG. 4, when the optical wavelength conversion elements of the first to third embodiments of the present invention were employed, a higher intensity of second harmonic was obtained in a narrower temperature range as compared with when the conventional optical wavelength conversion element (the control), that is, a higher wavelength conversion efficiency was obtained, which proved that periodicity of the periodic domain reversals was improved in the optical wavelength conversion elements of the present invention.

The domain reversal threshold voltage, that is, the voltage above which domain reversal is caused, was investigated for each of the doping materials and the result is shown in FIG. 5. As shown in FIG. 5, when LN (LiNbO$_3$) is doped with Sc or In, the domain reversal threshold voltage is lower than when LN is doped with Mg irrespective of the doping amount. When LN is doped with Zn, the domain reversal threshold voltage is lower than when LN is doped with Mg so long as the doping amount is not smaller than about 6.5 mol %. Thus by doping LN with Zn, Sc or In, domain reversal can be facilitated.

FIGS. 6A to 6D are 400× microphotographs respectively showing the Y-faces of the substrates of the optical wavelength conversion elements of the control and the first to third embodiments.

As can be seen from the microphotographs, though the width of the domain reversals is partly increased and periodicity of the periodic domain reversals is bad in the control, such a defect is hardly seen in any one of the first to third embodiments.

Though a $LiNbO_3$ substrate doped with Zn, Sc or In is employed in the embodiments described above, substantially similar results can be obtained even if a substrate of $LiTaO_3$ or $LiNbTaO_3$ doped with Zn, Sc or In or a substrate of $LiNb_xTa_{1-x}O_3$ ($0 \leq x \leq 1$) doped with two or three of Zn, Sc and In is employed.

What is claimed is:

1. An optical wavelength conversion element comprising a ferroelectric material which has a nonlinear optical effect, is provided with periodic domain reversals arranged in one direction and converts a wavelength of a fundamental wave impinging thereupon in a direction in which the periodic domain reversals are arranged, wherein said ferroelectric material is $LiNb_xTa_{1-x}O_3$ ($0 \leq x \leq 1$) doped with at least one of Zn, Sc and In.

2. A method of manufacturing an optical wavelength conversion element comprising the step of forming periodic domain reversals on a single domain ferroelectric material having a nonlinear optical effect by applying electric fields to the ferroelectric material through periodic electrodes formed in a predetermined pattern, wherein the ferroelectric material is $LiNb_xTa_{1-x}O_3$ ($0 \leq x \leq 1$) doped with at least one of Zn, Sc and In.

\* \* \* \* \*